United States Patent [19]

Luetzelschwab

[11] Patent Number: 4,508,858

[45] Date of Patent: Apr. 2, 1985

[54] APPARATUS AND METHOD FOR PREPARING POLYMER SOLUTIONS

[75] Inventor: Wayne E. Luetzelschwab, Littleton, Colo.

[73] Assignee: Marathon Oil Company, Findlay, Ohio

[21] Appl. No.: 466,737

[22] Filed: Feb. 16, 1983

[51] Int. Cl.[3] .............................................. C08L 33/26

[52] U.S. Cl. .................................... 523/313; 523/318; 523/348; 524/827; 525/329.4

[58] Field of Search ................ 524/555, 827; 523/313, 523/318, 348; 525/329.4

[56] References Cited

U.S. PATENT DOCUMENTS

| | | | |
|---|---|---|---|
| 2,820,777 | 1/1958 | Suen et al. | 525/329.4 |
| 3,022,279 | 2/1962 | Proffitt | 525/329.4 |
| 3,255,142 | 6/1966 | Terenzi | 523/318 |
| 3,458,467 | 7/1969 | Herrle et al. | 523/318 |
| 3,968,093 | 7/1976 | Hasegawa et al. | 524/827 |
| 4,001,161 | 1/1977 | Song et al. | 524/827 |
| 4,021,394 | 5/1977 | Tuka et al. | 524/555 |
| 4,110,521 | 8/1978 | Barrett et al. | 526/86 |
| 4,402,916 | 9/1983 | Luetzelschwab | 422/256 |
| 4,464,509 | 8/1984 | Schroeder, Jr. | 523/318 |

*Primary Examiner*—Joseph L. Schofer
*Assistant Examiner*—N. Sarofim
*Attorney, Agent, or Firm*—Jack L. Hummel

[57] ABSTRACT

Apparatus and method for the on-site, continuous preparation of aqueous solutions of polymers, especially aqueous solutions of partially hydrolyzed polyacrylamides, for use in secondary and tertiary oil recovery operations. The apparatus comprises a polymerization reactor and a post reactor. Successive batches of a preprepared reaction mixture are continuously fed into the polymerization reaction in a manner to form zones or layers in the reactor, each zone or layer comprising a reaction mixture which has reached a different stage or level of completion of the reaction than the zone or layer below and above it. The zones or layers are continuously moved through the polymerization reactor at a rate such that when a zone or layer reaches the outlet of the polymerization reactor, the reaction will have gone to substantial completion. The zones or layers are continuously conveyed from the polymerization reactor to the post reactor. Enroute to the post reactor, a polymer modifying agent is continuously introduced into the zones or layers from the polymerization reactor. A second reaction mixture is established in the post reactor in which the extent of the completeness of the reaction taking place in the post reactor varies from the inlet to the outlet thereof. The second reaction mixture is continuously moved through the post reactor at a flow rate such that the reaction will be substantially complete when the outlet of the post reactor is reached.

10 Claims, 2 Drawing Figures

APPARATUS AND METHOD FOR PREPARING POLYMER SOLUTIONS

TECHNICAL FIELD

The present invention relates to apparatus, and to a method, for preparing polymer solutions, and, in particular, to apparatus and a method for the on-site, continuous preparation of aqueous polymer solutions of the type used in secondary and tertiary oil recovery operations.

BACKGROUND OF PRIOR ART

Various apparatus and methods for the continuous preparation of aqueous polymer solutions, including aqueous solutions of hydrolyzed polyacrylamides, heretofore have been proposed. One such method is disclosed in U.S. Pat. No. 2,820,777. The method of that patent utilizes a single reaction vessel, and comprises polymerizing and hydrolyzing acrylamide monomer in a single-step to obtain a composition containing amide and carboxylate groups. The method is carried out by forming two solutions, one of which comprises acrylamide monomer and water, and the other of which comprises a polymerization catalyst, an alkali metal hydroxide, and water. The hydroxide is present in an amount ranging between about 0.01:1 to about 0.25:1 mols per mole of acrylamide monomer. The solutions are pumped separately, at an equal volume rate, into a common reactor. The residence time of the reactants in the reactor may, according to the patent, vary from 10 minutes to 5 hours. While the patent suggests that the properties of the end products can be altered by varying the proportions of the reactants and the conditions under which polymerization and hydrolyzation are simultaneously carried out, the haphazard, all-in-one-pot nature of the method makes it unsuitable for the preparation of aqueous polymer solutions for use in secondary and tertiary oil recovery procedures where it is necessary to provide an end product having predictable properties from the standpoint of its ability to meet the performance demands of an oil-bearing formation or reservoir. U.S. Pat. No. 4,110,521 is also directed to apparatus and a method for the continuous preparation of aqueous polymer solutions. The apparatus disclosed in the patent is relatively complex and costly. More specifically in this connection, the apparatus incorporates large numbers of static mixers, and requires the extensive use of pumps and temperature control means throughout the system, all of which make it impractical and unsuitable for the on-site preparation of aqueous polymer solutions of the type employed in the secondary and tertiary recovery of oil.

BRIEF SUMMARY OF THE INVENTION

The apparatus and method of the present invention is uniquely suited for the on-site, continuous preparation of aqueous polymer solutions for use as drive fluids and/or mobility control buffers in the secondary or tertiary recovery of oil from subterranean oil-bearing formations or reservoirs. The apparatus is inexpensive to build, and easy to install and operate. In addition, it enables the formation of a polymer solution to be closely monitored at all stages in its preparation to provide an end product having maximum effectiveness in meeting the performance demands of substantially any oil-bearing formation or reservoir.

In accordance with one aspect of the present invention, the apparatus comprises reactant mixture receiving means in which polymerization is initiated, polymerization reactor means in which polymerization is completed, and post polymerization reactor means in which the polymer from the polymerization reactor means is converted to a desired form for ultimate use. The reactant mixture receiving means advantageously comprises at least one reactor, the volume of which desirably is appreciably less than that of either the polymerization or the post reactor means, into which the reactants are introduced, mixed and permitted to partially react. The polymerization reactor means is in communication with the reactant mixture receiving means, and is provided at its inlet end with distributor means for introducing the partially polymerized solution into the polymerization reactor means in a manner to substantially uniformly and evenly distribute the solution across the internal cross-sectional area thereof. The polymerization reactor means, in turn, is in communication with the post reactor means. The post reactor means, like the polymerization reactor means, advantageously is provided with distributor means for introducing the completely polymerized solution, together with any reactants for modifying or converting the polymer to a desired form for ultimate use, into the post reactor means in a manner to substantially uniformly and evenly distribute the reaction mixture across the internal cross-sectional area thereof. The reactant, or reactants, employed to modify or convert the polymer to a form for ultimate use desirably is fed into the polymer solution at a point upstream of the post reactor means, and the resulting reaction mixture advantageously is passed through mixing means prior to introduction into the post reactor means. The polymerization and the post reactor means are characterized in that they are not provided with stirring or mixing means. Pumps are associated with the receiving and reactor means for regulating the movement of the polymer solution through the entire system. One or more heat exchangers may be employed for controlling the temperature of the polymer solution as needed.

In accordance with one of the method aspects of the invention, a reaction mixture comprising an aqueous solution of a monomer and a polymerization initiator or catalyst is formed in the reactant mixture receiving means. The mixture desirably is held in the receiving means for a time sufficient to initiate polymerization, and is then conveyed to the distributor means positioned at the inlet end of the polymerization reactor means. The reaction mixture is passed into and through the polymerization reactor means at a rate such that when the mixture reaches the outlet thereof, polymerization of the monomer is essentially complete. The polymer solution is thereafter conveyed from the polymerization reactor means to the distributor means at the inlet end of the post reactor means. Enroute to the post reactor means, a polymer modifying agent, or agents, advantageously is continuously entrained in the polymer solution stream. The polymer solution, together with any modifying agent, are introduced into the post reactor means through the distributor means, and are passed through the post reactor means at a rate to enable conversion of the polymer to a desired form to go to completion. From the post reactor means, the converted polymer solution is transferred to a point where it is further treated, usually by the addition of water, to reduce the polymer to a desired concentration for ultimate use. The steps of the method are repeated to establish in the polymerization reactor means and the post reactor means a variation in the completeness of the reaction taking place therein, and to provide a continuous flow of aqueous polymer solution from the system. In the case of the polymerization reaction means, the variation in the completeness of the polymerization reaction manifests itself in the form of a plurality of zones or layers each of which comprises an aqueous polymer solution wherein polymerization has progressed to a stage which differs from that of every other zone or layer in the polymerization reactor means, and which is more advanced than in each of the zones or layers tailing it but less advanced than in each of the zones or layers preceding it, and, further, by the fact that each zone or layer shares a substantially stable interface with the zone or layer immediately leading it and the zone or layer immediately trailing it. While the variation in the completeness of the reaction taking place in the post reactor means does not manifest itself in the form of zones or layers comparable to those in the polymerization reactor means, discernible differences exist in the progress of the reaction taking place therein. Thus, at the inlet end of the post reactor means, the reaction between the polymer and the modifying agent, or agents, may be just starting, or have progressed to only a minor extent. In the area of the post reactor means between the inlet and the outlet thereof, the reaction may have progressed anywhere from forty to ninety percent of completion. In any event, the final or last zone or layer, that is, the zone or layer nearest the outlet in the case of the polymerization reactor means, and the reaction mixture nearest the outlet of the post reactor means will always comprise solutions in which the reactions have essentially gone to completion, and the resulting product is in a state to be either moved to another station in the system, or to a point away from the system to be further treated or modified for ultimate use. The progress of the reactions occurring in each of the reactor means can be readily monitored, and the rate of flow of fluids in the system can be controlled or regulated to assure that the end product, whether it be the polymerized monomer, or the converted polymer, has the desired properties.

The foregoing, and other features and advantages of the invention will become more apparent from the description to follow, taken in conjunction with the accompanying drawing.

DETAILED DESCRIPTION OF THE INVENTION

Figure 1:
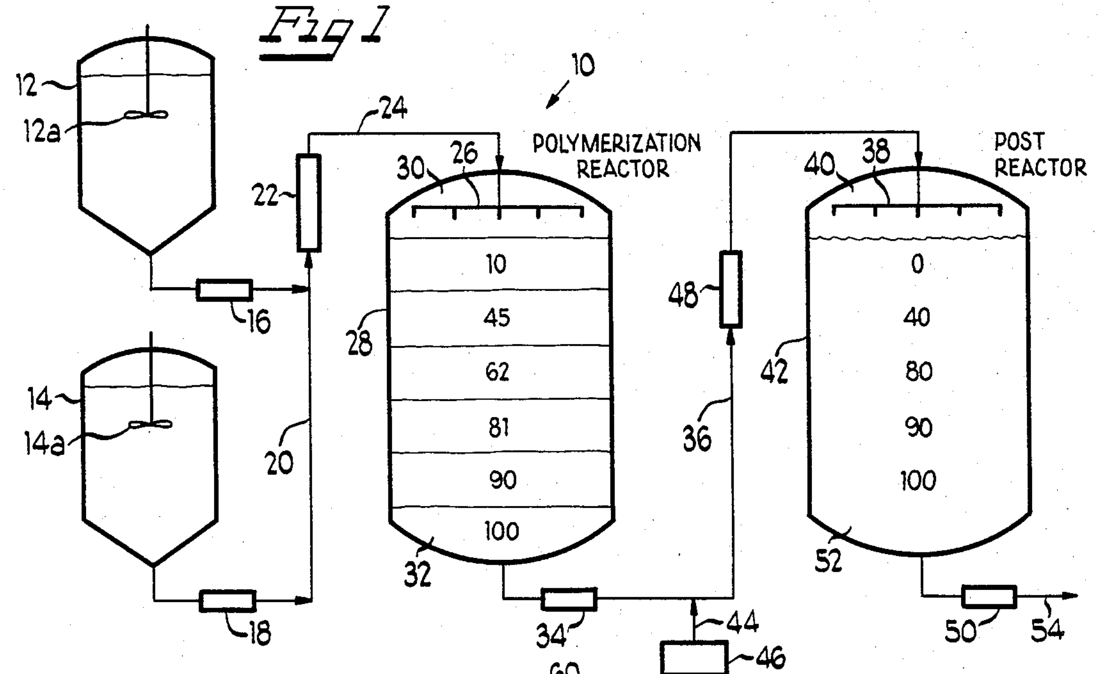
FIG. 1 is a diagrammatic view of an embodiment of the apparatus of the present invention employing a pair of reactant mixture receiving vessels.

The embodiment of the apparatus illustrated in FIG. 1, and designated generally by reference numeral 10, has special utility for the on-site, continuous preparation of aqueous polymer solutions such as aqueous partially hyrolyzed polyacrylamide solutions employed in secondary and tertiary oil recovery operations. As shown, the apparatus includes reactant mixture receiving vessels 12 and 14, each of which advantageously is provided with a stirrer 12*a* and 14*a*, respectively. The capacity of the vessels 12 and 14 is variable, and will depend, in the main, upon the demands of the oil-bearing formation or reservoir of interest. Generally speaking, the capacity of the vessels 12 and 14 will range from about 2000 to about 5000, usually about 3000 gallons. The vessels 12 and 14 are each in communication with a pump such as pumps 16 and 18, respectively. The pumps 16 and 18, in turn, are in communication with a common conduit 20 desirably connected to a heat exchanger 22. The heat exchanger 22 is connected through a conduit 24 to a distributor 26 positioned internally of a polymerization reactor 28 at the inlet 30 thereof. The distributor 26 may be in the form of a perforated, circular plate having a diameter corresponding to the internal diameter of the reactor 28. In a preferred embodiment of the apparatus 10, the distributor 26 comprises a plurality of arms or extensions which radiate outwardly from the center of the inlet 30 of the reactor 28. The arms or extensions, which may vary in number from 4 to 8, or more, are provided with holes or openings sized and spaced so that flow of fluid therethrough is evenly distributed across the internal cross-sectional area of the reactor. If desired, a slot, corresponding in length to the length of the radiating arms or extensions, may be employed in lieu of holes or openings to achieve uniform distribution of fluids entering the reactor 28. The capacity of the reactor 28 can range from about 15,000 to about 150,000 gallons, again depending upon the demands of the oil-bearing reservoir of interest. The reactor 28 has an outlet end 32 in communication with a pump 34. The pump 34 is connected by a conduit 36 to a distributor 38 positioned internally at the inlet end 40 of a post reactor 42 desirably having a capacity corresponding to the capacity of the reactor 28. The distributor 38, like the distributor 26, can be in the form of a perforated, circular plate, or, may comprise a plurality of perforated or slotted arms or extensions as described hereinabove. A conduit 44, connected to a source 46 of a chemical agent, or agents, for modifying or converting the polymer from the reactor 28 to a desired form, intersects the conduit 36 at a point downstream from the pump 34. A mixing unit such as a static mixer 48 advantageously is positioned in the conduit 36 downstream from the intersection of the conduit 36 with the conduit 44. A pump 50 is connected to the outlet end 52 of the post reactor 42, and to a conduit 54 for transferring the polymer solution from the reactor 42 to either a holding area or to a polymer solution dilution station (not shown).

Figure 2:
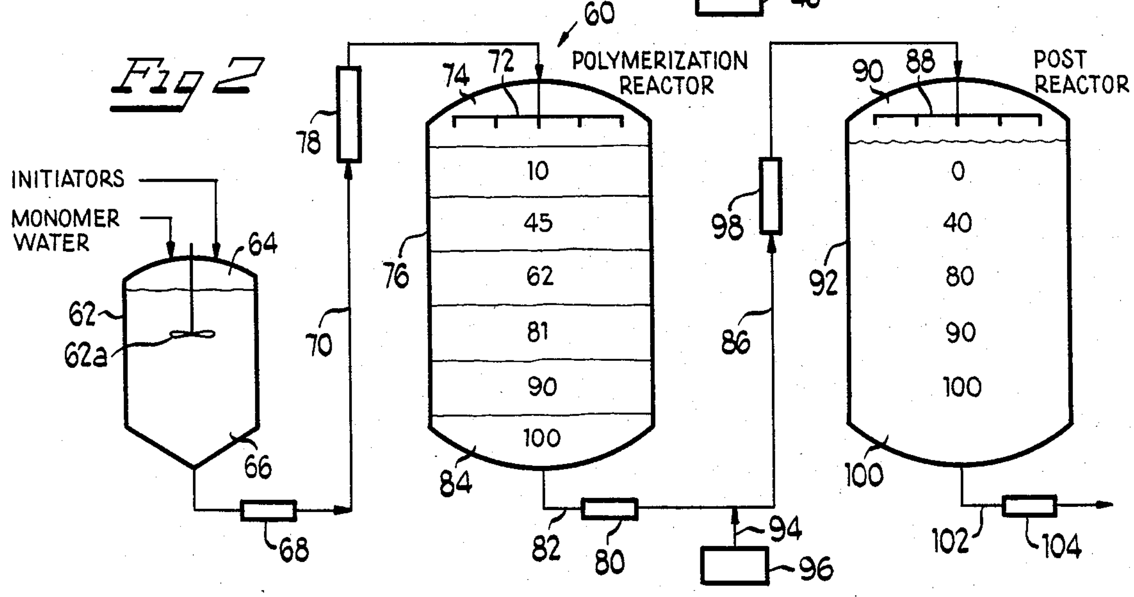
FIG. 2 is a diagrammatic view of another embodiment of the apparatus of the invention wherein a single reactant mixture receiving vessel is shown.

The embodiment of the apparatus of the present invention shown in FIG. 2, and designated generally by reference numeral 60, is similar to the embodiment 10 of the apparatus illustrated in FIG. 1, except that a single reactant mixture receiving vessel 62 is employed instead of the two vessels 12 and 14 as in the apparatus 10. A stirrer 62*a* desirably is provided for the vessel 62. The capacity of the vessel 62 advantageously is greater than that of either of the vessels 12 and 14, and may range from about 5,000 to about 10,000, preferably about 7,500 gallons. The outlet end 66 of the vessel 62 is connected to a pump 68, the pump 68, in turn, being connected by a conduit 70 to a distributor 72 positioned internally at the inlet end 74 of a polymerization reactor 76 having a capacity corresponding to the capacity of the reactor 28 of the apparatus 10 shown in FIG. 1. A heat exchanger 78 desirably is located in the conduit 70 between the pump 68 and the distributor 72. The distributor 72 may be similar in construction to the distributor 26 positioned in the reactor 28 of the apparatus 10 shown in FIG. 1. A pump 80 is connected by a conduit 82 to the outlet end 84 of the reactor 76, and by a conduit 86 to a distributor 88 positioned internally, at the inlet end 90 thereof, of a post reactor 92. Again, the distributor 88 may be similar in construction to the distributor 38 in the post reactor 42 of the apparatus illustrated in FIG. 1. The conduit 86 is intersected at a point downstream of the pump 80 by a conduit 94 connected to a source 96 of a chemical agent, or agents, for modifying or converting the polymer from the reactor 76 to a desired form. A mixing unit such as a static mixer 98 desirably is located in the conduit 86 downstream of the intersection of the conduit 94 with the conduit 86. The capacity of the reactors 76 and 92 of the apparatus 60 may be the same as the capacity of the reactors 28 and 42 of the apparatus 10 of FIG. 1. The outlet end 100 of the post reactor 92 is connected by a conduit 102 to a pump 104 which is in communication with other equipment at the site for further dilution of the polymer solution from the reactor 92 prior to its injection, for example, into an input well.

In order to illustrate the use of the apparatus, as well as the method aspects, of the present invention in the preparation of an aqueous solution of a partially hydrolyzed polyacrylamide of the type employed in the secondary and tertiary recovery of oil from subterranean oil-bearing formations, specific reference will be made to the embodiment of the apparatus shown in FIG. 2. For purposes of this illustration, the receiving vessel 62 has a capacity of approximately 5000 gallons. The reactors 76 and 90 each have a capacity of about 100,000 gallons. An aqueous monomer solution comprising about 6%, by weight, acrylamide monomer is fed into the vessel 62 along with a polymerization initiator. For purposes of this illustration, a cocatalyst system comprising sodium bisulfite and ammonium persulfate is employed as the initiator. The sodium bisulfite is first introduced into the vessel 62 to act as an oxygen scavenger. Ammonium persulfate is then added. The concentration of the catalysts is about 180 ppm of the bisulfite, and about 400 ppm of the persulfate, based upon the weight of monomer. The resulting reaction mixture is then stirred in the vessel 62, and polymerization is initiated. The reaction temperature is in the range of about 100° F. to about 110° F. The residence time of the reaction mixture in the vessel 62 is about 0.5 hours, at which time polymerization of the monomer will have reached a level of approximately 10%. The reaction mixture is then transferred at a rate of about 100 gallons per minute from the vessel 62, through the heat exchanger 78, and to the distributor 72 in the polymerization reactor 76. The reactor 76 desirably is sparged with nitrogen to remove any oxygen. The temperature of the reaction mixture as it enters the reactor 76 is approximately 90° F.

After the vessel 62 has been emptied, an aqueous monomer solution, together with the same cocatalyst system described above, is again introduced into the vessel 62. The resulting reaction mixture is processed in the same manner as before, and is then conveyed to the reactor 76. This procedure is repeated until a plurality of zones or layers of polymer solutions, in each of which a different level of polymerization has been reached, have been formed in the reactor 76. The zones or layers are schematically illustrated in FIG. 2, the number within each zone or layer indicating the percent of completion of the polymerization reaction. The distributor 72 acts to uniformly and evenly spread or distribute each successive incoming batch of partially reacted monomer solution from the vessel 62 on the preceding batch in a manner to minimize penetration of the incoming batch into the preceding batch, and to promote the formation of a stable interface between the incoming batch and the preceding batch. Each zone or layer has a minimum residence time in the reactor 76 of from about 20 to about 30 hours, preferably about 25 hours to give a total reaction of time of about 26 hours.

When polymerization has reached completion in the first zone or layer introduced into the reactor 76, as indicated by the number 100 in FIG. 2, the polymer solution is withdrawn at a flow rate of about 55 gallons per minute from the reactor 76, and conveyed along conduit 86 to a point where it is mixed under continuous flow conditions with a hydrolyzing agent, or agents, from the source 96. The preferred agent for this purpose is a 50% solution of sodium hydroxide. The amount of the hydroxide introduced into the polymer solution stream desirably is sufficient to hydrolyze approximately 20% to about 40% of the amide groups comprising the polymer. Following introduction of the hydrolyzing agent, the resulting reaction mixture is passed through static mixer 98, and then to the distributor 88 at the inlet end of the post reactor 92. Passage of the reaction mixture into the post reactor takes place continuously with the result that the extent of the completeness of the reaction between the polymer and the hydrolyzing varies continuously from the inlet of the reactor to the outlet thereof. In FIG. 2, the numerals indicate the approximate percent of completion of the hydrolysis reaction at various levels in the reactor 92. The distributor 88, like the distributor 72 in the polymerization reactor 76, acts to uniformly and evenly spread the incoming reaction mixture in a manner to minimize penetration of fluid already in the reactor. When the hydrolysis reaction has gone to completion as indicated by the number 100 in FIG. 2 at the outlet end of the reactor 92, the partially hydrolyzed polymer solution is withdrawn at a rate of about 55 gallons per minute from the reactor 92 by the pump 104, and conveyed to another area for further dilution prior to injection into an input well at the oil-bearing formation.

In order to determine the quality of the polymer produced in the polymerization reactor 76, samples were taken at the pump discharge of reactor 76. The results are tabulated below. Sample numbers indicate the batch number. For example, Sample 2 represents material from the center of the second batch introduced into the reactor. Sample 2/3 represents material at the interface of the second and third batches.

PRODUCT QUALITY

| | 500 ppm Polymer 500 ppm NaCl | | 1,000 ppm Polymer 20,000 ppm NaCl | |
|---|---|---|---|---|
| Sample* | Visc., cp | Screen Factor | Visc., cp. | Screen Factor |
| 1/2 | 32.6 | 25.2 | 10.5 | 27.9 |
| 2 | 32.8 | 28.9 | 11.3 | 33.1 |
| 2/3 | 32.6 | 30.4 | 11.9 | 34.6 |
| 3 | 37.3 | 32.7 | 12.9 | 36.3 |
| 3/4 | 36.6 | 34.4 | 13.1 | 38.2 |
| 4 | 34.9 | 32.9 | 12.4 | 36.0 |

The data indicates that a high quality polymer is produced.

The operation of the apparatus 10 shown in FIG. 1 is similar to that of the apparatus 60 just described, except that two polymerization initiation vessels 12 and 14 are used to form batches of a reaction mixture, the mixture from each batch being alternately fed into the polymerization reactor 28 to form zones or layers, as illustrated, the numerals, again, indicating the percent of completion of the reaction. The polymer solution from the reactor 28 is then processed in the same manner as the polymer solution produced in the reactor 76 of the apparatus 60 of FIG. 2. The numerals in the reactor 42, as in the case of the reactor 92 of the apparatus 60, indicating the approximate percent completion of the hydrolysis of the amide groups comprising the polyacrylamide.

While the apparatus and method of the present invention have been described and illustrated with relation to their specific use for the on-site preparation of partially hydrolyzed polyacrylamide solutions to be employed in the secondary and tertiary recovery of oil from oil-bearing subterranean formations, it should be understood that such description and showing have been presented by way of illustration and example, and not by way of limitation, and that the apparatus and method may be adapted for use in the preparation of other polymer solutions.

I claim:

1. A process for the continuous preparation of aqueous polymer solutions for use as drive fluids and/or mobility control buffers in the secondary or tertiary recovery of oil from subterranean oil-bearing formations, comprising: forming a first reaction mixture containing a polymerizable substance and a polymerization initiator; introducing said reaction mixture into a first reaction vessel having an inlet and an outlet; repeating at regular predetermined intervals the forming of additional reaction mixtures corresponding to said first reaction mixture and introducing each of said additional reaction mixtures successively into the first reaction vessel in a manner to substantially uniformly and evenly distribute each of said additional reaction mixtures across the internal cross-sectional area of said first reaction vessel to provide a plurality of individual layers therein, each of said layers sharing a substantially stable interface with the layer immediately preceding it and the layer immediately succeeding it and comprising a reaction mixture in which the extent of the polymerization reaction has reached a stage which differs from that of every other layer in the first reaction vessel; controlling the rate of movement of each reaction mixture layer in said reaction vessel from the inlet to the outlet thereof in a manner such that as each reaction mixture layer is continuously moved through the reaction vessel the polymerization of the polymerizable substance in each reaction mixture layer will be essentially completed when each of the reaction mixture layers successively reaches the outlet of the first reaction vessel; successively and continuously removing each of the layers from the outlet of the first reaction vessel; introducing a modifying agent capable of reacting with the polymer formed in the first reaction vessel into each of the layers as they are successively and continuously removed from said first reaction vessel to form each layer into a second reaction mixture; successively and continuously introducing each layer of said second reaction mixture into a second reaction vessel having an inlet and an outlet in a manner to substantially uniformly and evenly distribute each layer of said second reaction mixture across the internal cross-sectional area of said second reaction vessel to provide a plurality of individual zones of said second reaction mixture therein, each of said zones of the second reaction mixture being characterized in that the extent of the completeness of the reaction between the polymer and the modifying agent varies progressively from the inlet to the outlet of the second reaction mixture; successively and continuously removing each of the zones of the second reaction mixture from the outlet of the second reaction vessel; and diluting said second reaction mixture prior to injecting it into an input well of a subterranean oil-bearing formation.

2. A process according to claim 1 wherein the extent of the completeness of the reaction between the polymer and the modifying agent varies from about 0% at the inlet of the second reaction vessel to about 100% at the outlet thereof.

3. A process according to claim 1 wherein the second reaction mixture is subjected to mixing prior to introduction into the second reaction vessel.

4. A process according to claim 1 wherein the first reaction mixture is formed in a reaction vessel separate from said first reaction vessel and is maintained therein until the reaction between the polymerizable substance and the polymerization initiator has been initiated.

5. A process according to claim 1 wherein the first reaction mixture is formed in reaction vessels separate from each other and from said first reaction vessel and is maintained in said separate reaction vessels until the reaction between the polymerizable substance and the polymerization initiator has been initiated, the reaction mixture in each of said separate vessels being alternately but continuously introduced at predetermined intervals into the first reaction vessel.

6. A process according to claim 5 wherein two separate reaction vessels for the first reaction mixture are employed.

7. A process according to claim 1 wherein the polymerizable substance is an acrylamide monomer.

8. A process according to claim 1 wherein the residence time of each layer in the first reaction vessel is from about 1 to about 100 hours.

9. A process according to claim 1 wherein the polymerizable substance is an acrylamide monomer and the modifying agent is an alkali metal hydroxide, the modifying agent being used in an amount sufficient to react with from about 10% to about 50% of the amide groups comprising the acrylamide polymer.

10. A process according to claim 1 wherein the residence time of the reaction mixture in the second reaction vessel is from about 1 to about 15 hours.

* * * * *

UNITED STATES PATENT AND TRADEMARK OFFICE

CERTIFICATE OF CORRECTION

PATENT NO. : 4,508,858

DATED : April 2, 1985

INVENTOR(S) : Wayne E. Luetzelschwab

It is certified that error appears in the above-identified patent and that said Letters Patent are hereby corrected as shown below:

Col. 8, line 14: Delete "mixture" and insert --vessel--.

Signed and Sealed this

*Twenty-sixth* Day of *November 1985*

[SEAL]

*Attest:*

DONALD J. QUIGG

*Attesting Officer*

*Commissioner of Patents and Trademarks*